(12) United States Patent
Biewendt et al.

(10) Patent No.: US 6,241,280 B1
(45) Date of Patent: Jun. 5, 2001

(54) MOTOR VEHICLE PASSENGER SAFETY ARRANGEMENT

(75) Inventors: Marcus Biewendt, Wolfenbüttel; Rolf Bergmann, Gifhorn; Ernst-Wilhelm Ritters, Braunschweig; Joachim Schütz, Hanum, all of (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 09/535,113

(22) Filed: Mar. 24, 2000

Related U.S. Application Data

(63) Continuation of application No. PCT/EP98/05537, filed on Sep. 1, 1998.

(51) Int. Cl.⁷ .................................................. B60R 21/32
(52) U.S. Cl. ...................... 280/735; 180/268; 280/730.2; 280/733; 280/806
(58) Field of Search ..................... 280/733, 806, 280/735, 730.2, 807; 180/268; 701/45

(56) References Cited

U.S. PATENT DOCUMENTS

| | | | |
|---|---|---|---|
| 3,951,430 | 4/1976 | Schwanz et al. | 280/744 |
| 4,381,829 | 5/1983 | Montaron | 180/274 |
| 4,984,651 | 1/1991 | Grösch et al. | 180/268 |
| 5,202,831 | 4/1993 | Blackburn et al. | 364/424.05 |
| 5,234,228 * | 8/1993 | Morota et al. | 280/734 |
| 5,301,772 * | 4/1994 | Honda | 180/268 |
| 5,338,063 | 8/1994 | Takeuchi et al. | 280/735 |
| 5,398,185 | 3/1995 | Omura | 364/424 |
| 5,845,000 | 12/1998 | Breed et al. | 382/100 |
| 6,010,150 * | 1/2000 | Amann | 280/730.2 |

FOREIGN PATENT DOCUMENTS

| | | |
|---|---|---|
| 2423777 | 11/1975 | (DE) . |
| 2428564 | 1/1976 | (DE) . |
| 3904668 | 8/1990 | (DE) . |
| 3932417 | 4/1991 | (DE) . |
| 4112579 | 10/1991 | (DE) . |
| 4222595 | 1/1993 | (DE) . |
| 4419034 | 12/1994 | (DE) . |
| 4332205 | 3/1995 | (DE) . |
| 4426090 | 7/1995 | (DE) . |
| 19522684 | 6/1996 | (DE) . |
| 19526619 | 1/1997 | (DE) . |
| 2289786 | 11/1995 | (GB) . |

OTHER PUBLICATIONS

Patent Abstracts of Japan, M–1708, Nov. 21, 1994, vol. 18, No. 611, JP 06 234342 A.

* cited by examiner

Primary Examiner—Lanna Mai
Assistant Examiner—Ruth Ilan
(74) Attorney, Agent, or Firm—Baker Botts L.L.P.

(57) ABSTRACT

A passenger safety arrangement for a vehicle has a side air bag and a safety belt which acts as a restraining element for a passenger seated on a vehicle seat. The passenger safety arrangement also includes at least one sensor for detecting a lateral collision and at least one control unit for activating the lateral air bag and/or a belt tensioning device in response to signals supplied by the sensor. In order to improve passenger protection in the event of a lateral collision, the side air bag is activated by the control unit before actuation of the belt tensioning device.

8 Claims, 1 Drawing Sheet

MOTOR VEHICLE PASSENGER SAFETY ARRANGEMENT

REFERENCE TO RELATED APPLICATION

This application is a continuation of International Application No. PCT/EP98/05537 filed Sep. 1, 1998.

BACKGROUND OF THE INVENTION

This invention relates to passenger safety arrangements for motor vehicles having air bags and belt tighteners.

German Offenlegungsscbrift No. 195 26 619 discloses a passenger safety arrangement for controlling operation of a variety of safety devices, especially with respect to a broadside collision. That publication also discloses a simplified arrangement of side impact sensors. In addition, control of the operation of individual safety devices for a variety of accident scenarios is described.

A safety belt system with a belt lock tightening device which disengages in response to side impact loads is described in German Offenlegungsschrift No. 195 22 684. That document, in particular in the introduction to the description, points out that, in side impact loads on a motor vehicle, relative motions between the passenger in the vehicle and the corresponding vehicle seat may occur, despite a safety belt being fastened. In particular, during a side impact, the B column may be driven inwardly so that it moves closer to the passenger and to the vehicle seat Because of this inward movement of the B column toward the vehicle seat, a safety belt which has been previously fastened or tightened by a tightening device undergoes a corresponding slackening before the vehicle seat itself is also shifted sideways by further penetration of the colliding object. As a result of such belt slackening, the passenger is no longer held sufficiently firmly on the seat and thus is not optimally secured. To solve this problem, the safety belt in a seat region is passed over a shoulder of the passenger through a seat-secured belt guide having a belt-fastening device. This document does not disclose any cooperation of such a safety belt system with side air-bag.

SUMMARY OF THE INVENTION

Accordingly, it is an object of the present invention to provide a motor vehicle passenger safety arrangement which overcomes disadvantages of the prior art.

Another object of the invention to provide a motor vehicle passenger safety arrangement which minimizes the risk of injury to passengers in a vehicle having conventional safety devices.

These and other objects of the invention are attained by providing a motor vehicle passenger safety arrangement having a side air bag and a tightening device for a safety belt along with a side collision sensor and a control for activating the side air bag prior to activating the safety belt tightening device in response to sensing of a side collision.

Thus, according to the invention, a passenger safety arrangement has a side air bag that can always be activated by the control unit prior to activation of a belt tightener. This arrangement assures that, on the one hand, restraining protection against a penetrating collision object is developed as rapidly as possible and, on the other hand, the safety belt, after having been tightened, is not slackened when the B column moves, inwardly in the manner described above. This arrangement is advantageous because no structural changes of any kind need be made in the safety components which are normally provided in vehicles. The control unit that is present for activating the safety devices need only be adapted to activate them in the sequence described above. In addition to using the control unit to control the deployment times, the relative timing of side air-bag deployment on the one hand and tightener deployment on the other may also be additionally or alternatively achieved in other ways. Thus, for example, an additional sensor may be provided to detect the beginning of lateral vehicle seat displacement in response to the side collision and to produce a trigger signal to activate the tightening device separately from activation of the side air bag. This arrangement allows vehicle-specific installation conditions for individual safety systems to be taken into account. The arrangement according to the invention advantageously can also be combined with safety belt fastening devices.

An additional advantage of the invention is that conventional systems can be used for all of the associated safety components i.e., for a side air bag, a safety belt and a belt tightener. At the same time, however, the specific characteristic of individual systems should be taken into consideration for selection of the time interval between deployment of the safety devices. The specific body structure of the vehicle, the arrangement of the seats relative to side rails or sills, and the ignition characteristics of the pyrotechnic propellants used in the belt tightener and the air-bag safety components should be taken into account as influencing variables for the specification of a fixed time interval $\Delta t$ between actuation of an air bag and tightening of a safety belt.

BRIEF DESCRIPTION OF THE DRAWINGS

Further objects and advantages of the invention will be apparent from a reading of the following description in conjunction with the accompanying drawings in which.

DESCRIPTION OF PREFERRED EMBODIMENTS

Figure 1:
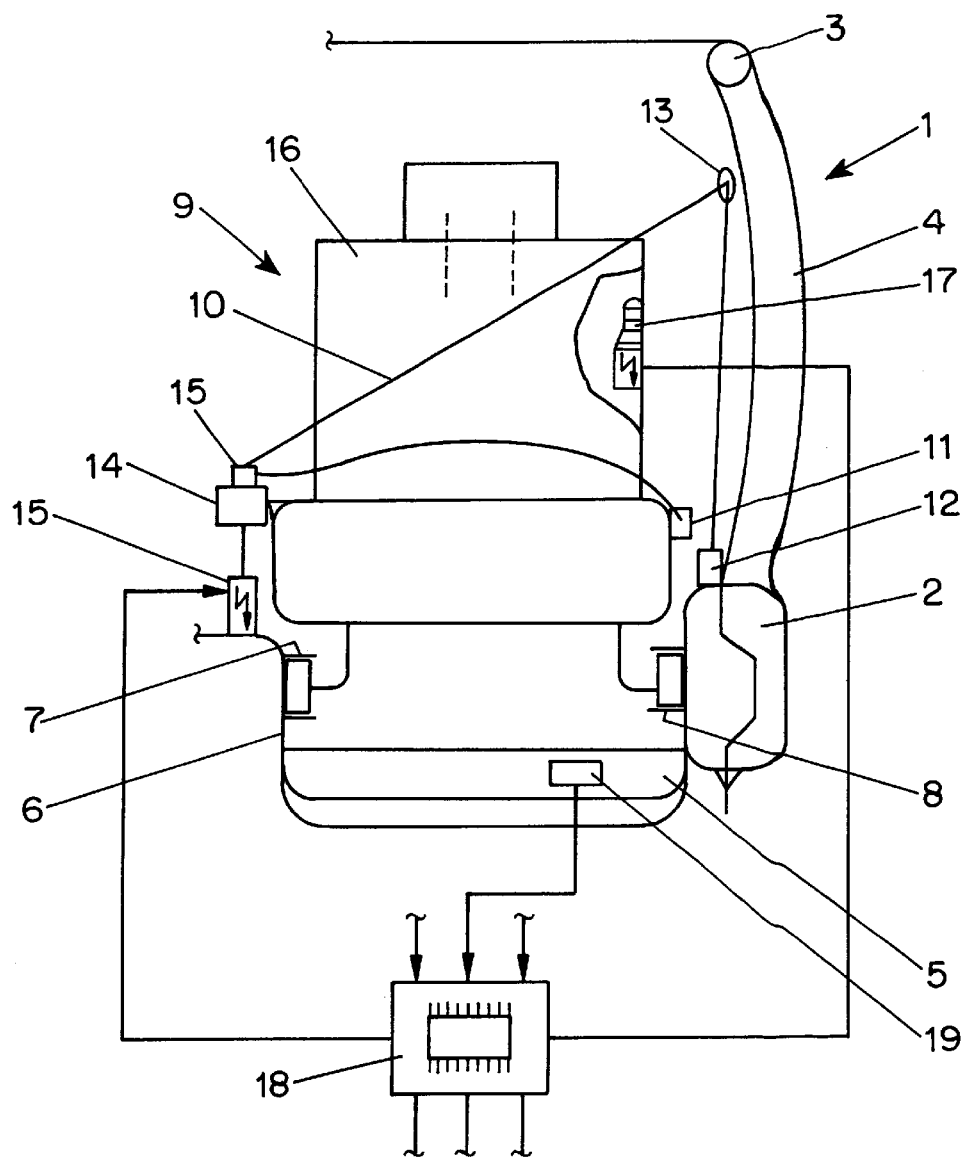
FIG. 1 is a schematic front view illustrating a representative embodiment of a motor vehicle passenger safety arrangement according to the invention.

In the typical embodiment of the invention shown in FIG. 1, a motor vehicle 1 includes a column 4, extending from a sill 2 all the way to a roofrack 3, and a seat cross member 5 which extends between the sill 2 and a central tunnel 6. Fastened to the opposed sides of the sill 2 and the central tunnel 6 are two guide rails 7 and 8, in which a vehicle seat 9 is longitudinally displaceable. The vehicle seat 9 has a safety belt 10 which is fixed at a first end to a seat-side belt anchorage 11 and extends at a second end into an automatic belt roll-up mechanism 12. A belt tun-around fitting 13, preferably adjustably mounted on the B column 4, together with a turn-around plate 15 lockable in a belt lock 14, determines the position of the safety belt 10 when it is fastened around a passenger in the seat. The belt lock 14 has a tightening device 15, shown schematically, which, like a side air bag 17 mounted to the backrest 16 of the vehicle seat 9, can be actuated by a control unit 18. The control unit is connected to a side collision sensor 19 which is fastened to the seat cross member 5.

It should be emphasized that the illustration of the embodiment shown in FIG. 1 is purely schematic in nature and is not limited to the specific arrangement illustrated. Thus, for example, the side air bag 17 may alternatively be mounted in the B column 4 or in an interior vehicle door panel, not illustrated. The tightening function need not necessarily be carried out by the belt lock 14 but may alternatively or additionally be carried out in the region of the anchoring point 11. Likewise possible are tightening devices that are associated with the automatic belt roll-up mechanism 12 in such a way that they cause a belt-extraction movement against rotation that results in a tightening of the safety belt. Also possible are belt loops surrounding the safety belt 10, which are displaceable from a rest position by a displacing piston so that a tightening of the safety belt 10 occurs as described, for example, in U.S. Pat. No. 3,951,430 or German Offenlegungsschrift No. 24 28 564.

In FIG. 1 of the drawings, only a selection from an entire spectrum of functions is schematically illustrated for the control unit 18. The control unit, of course controls safety devices in the other side of the vehicle side which are not seen in the drawing, and may optionally also be a component of a control system that controls airbag devices or other restraining systems responsive to frontal impact accidents or rollovers.

Figure 2:
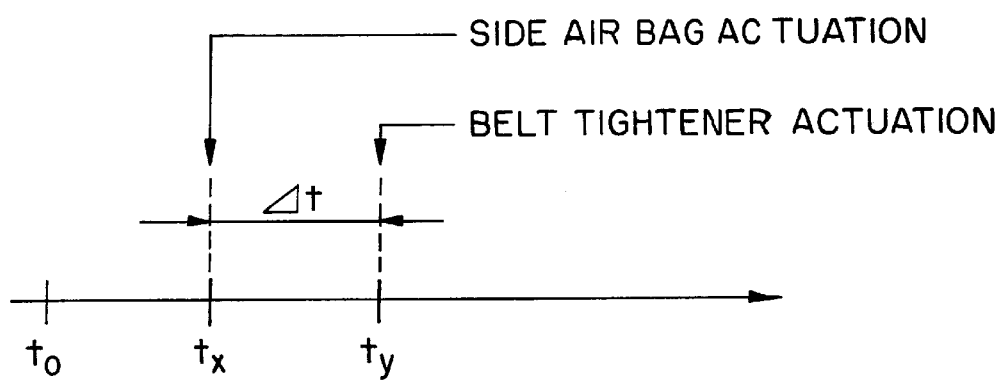
FIG. 2 is a timing diagram illustrating the activation times of components of a representative passenger safety arrangement according to the invention.

The timing of operation of the passenger protection arrangement represented in FIG. 1 will now be explained in detail with reference to FIG. 2 in which $t_0$ indicates the point in time at which a colliding object strikes the side of the vehicle. Depending upon the sensitivity and installation position of the side impact sensor 19, a certain time period passes before a side-impact accident situation is unequivocally detected at a time $t_x$. At that time, activation of the side air bag 17 takes place, causing the air bag to be projected between structural members in the vehicle side wall and the passenger, not shown, thereby causing a restraint to function at a very early point in time, specifically, when the actual motion of the B column 4 toward the vehicle seat is still in an initial stage and is far from being terminated. This motion of the B column 4 toward the seat causes the safety belt turn-around fitting 13 to move into the vehicle interior and thus produces slack in the safety belt 10 before the B column is pushed into the vehicle interior by the collision object. The timing of activation of the belt tightener 15 with respect to this motion is determined so that, on the one hand, the safety belt 10 undergoes maximum slackening, because of the inward motion of the B column 4 but, on the other hand, the passenger is still held firmly held in the vehicle seat 9. The optimum time for activation of the tightening device 15 should be selected in view of its performance characteristic so that the tightening operation is terminated at the beginning of a sideward shift of the vehicle seat 9. This time may either be determined empirically, according to the specific vehicle and/or components, or, as described above, may be detected by an additional sensor system. However, it should be emphasized at this point that mechanical sensor systems, which need not necessarily be connected with the control unit 18, may also be used for the tightening device 15. The response behavior of these systems should be designed so that, with regard to foreseeable accident scenarios, the actuation of the tightening devices always takes place at a predetermined later time after air-bag deployment.

In principle, the conditions described above also apply to safety belt devices that are assigned to the back seats of a vehicle. Appropriate actuation time delays dependent upon vehicle-specific conditions, should also be set in this case. For passenger cars, the deployment time $t_y$ for the belt tightener may be selected so that a time delay $\Delta t$ from 0 ms to 10 ms, preferably from 4 ms to 10 ms, is provided. For vehicles of the so-called Golf class, a time delay $\Delta t$ of 6 to 8 ms is appropriate with respect to the B column.

Although the invention has been described herein with reference to specific embodiments, many modifications and variations therein will readily occur to those skilled in the art. Accordingly, all such modifications and variations are included within the intended scope of the invention.

We claim:

1. A passenger safety arrangement for a motor vehicle comprising:

at least one side air bag laterally positioned with respect to a passenger seated on a vehicle seat;

a safety belt which acts as a restraining element for the passenger seated on a vehicle seat;

at least one tightening device for the safety belt;

at least one sensor for detection of a side impact; and at least one control unit responsive to signals from the sensor for activating the side air bag and the tightening device and causing the tightening device to be activated at a predetermined time following activation of the side air bag.

2. A passenger safety arrangement according to claim 1 wherein the control unit is preset to cause a specific time interval to elapse between activation of the side air bag and activation of the tightening device.

3. A passenger safety arrangement according to claim 2 wherein the specific time interval is in a range of up to about 10 ms.

4. A passenger safety arrangement according to claim 2 wherein the specific time interval is in the range from about 4 ms to about 10 ms.

5. A passenger safety arrangement according to claim 2 wherein the specific time interval is in the range from about 6 ms to about 8 ms.

6. A passenger safety arrangement according to claim 1 wherein the at least one tightening device is a locking tightener.

7. A passenger safety arrangement according to claim 1 wherein the at least one tightening device is a belt tightener acting on an automatic belt roll-up mechanism.

8. A passenger safety arrangement according to claim 1 wherein the at least one tightening device is a belt tightener acting on a belt strap by a pull loop.

* * * * *